US012024327B2

(12) United States Patent
van Wonderen et al.

(10) Patent No.: US 12,024,327 B2
(45) Date of Patent: Jul. 2, 2024

(54) SYSTEM AND METHOD FOR ASSISTING ERROR RECOVERY IN AN AUTOMATED PACKAGING PROCESS AND SYSTEM AND METHOD FOR AUTOMATICALLY PACKAGING SHIPMENT SETS

(71) Applicant: Sparck Technologies B.V., Drachten (NL)

(72) Inventors: Michel van Wonderen, Drachten (NL); Aise Bouma, Drachten (NL)

(73) Assignee: SPARCK TECHNOLOGIES B. V., Drachten (NL)

( * ) Notice: Subject to any disclaimer, the term of this patent is extended or adjusted under 35 U.S.C. 154(b) by 417 days.

(21) Appl. No.: 17/164,226

(22) Filed: Feb. 1, 2021

(65) Prior Publication Data
US 2021/0237913 A1 Aug. 5, 2021

(30) Foreign Application Priority Data

Jan. 31, 2020 (EP) ..................................... 20155039

(51) Int. Cl.
*B65B 5/06* (2006.01)
*B65B 59/00* (2006.01)
(Continued)

(52) U.S. Cl.
CPC .............. *B65B 5/06* (2013.01); *B65B 59/001* (2019.05); *B65G 1/1378* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 1,206,805 | A | * | 12/1916 | Bonnet .................. B42D 15/00 283/56 |
| 1,684,756 | A | * | 9/1928 | Close ................. B42D 15/0053 462/67 |

(Continued)

FOREIGN PATENT DOCUMENTS

| | | |
|---|---|---|
| EP | 3200036 A1 | 8/2017 |
| WO | 2014117817 A1 | 8/2014 |

(Continued)

OTHER PUBLICATIONS

"International Fibreboard Case Code," published by FEFCO and ESBO, 2007, 11th edition.

(Continued)

*Primary Examiner* — Fateh M Obaid
(74) *Attorney, Agent, or Firm* — Cozen O'Connor

(57) ABSTRACT

A method of assisting error recovery in an automated packaging process of packaging shipment sets of one or more items, said packaging process comprising a plurality of processing stages, the method comprising: at an entry stage of the automated packaging process, for each shipment set: assigning a unique processing set identifier to the shipment set: obtaining processing data for the shipment set, acquiring a representation of the shipment set, and recording a dataset by associating said unique processing set identifier with the processing data of said shipment set and with said representation; and on occurrence of a processing error affecting a shipment set: obtaining a collection of datasets of each shipment set potentially affected, configuring a user interface at the entry stage with the representations of the shipment sets in said collection and for allowing selecting an affected shipment set, and receiving selections via the user interface a shipment set of re-entering and re-entering he items(s) of the affected shipment sets into the automated (Continued)

packaging process using the processing data recorded in the dataset of the selected shipment set.

11 Claims, 10 Drawing Sheets

(51) Int. Cl.
  *B65G 1/137* (2006.01)
  *G06Q 10/087* (2023.01)

(56) References Cited

U.S. PATENT DOCUMENTS

| | | | | |
|---|---|---|---|---|
| 5,600,565 | A * | 2/1997 | Wagner | G06Q 10/08 700/219 |
| 6,155,025 | A * | 12/2000 | Komiya | B65B 5/10 53/154 |
| 7,085,677 | B1 * | 8/2006 | Champlin | G06Q 10/087 702/182 |
| 7,246,144 | B2 * | 7/2007 | Walsh | G06Q 10/10 709/200 |
| 7,375,841 | B1 * | 5/2008 | Polis | B29B 17/0036 358/1.18 |
| 7,603,229 | B2 * | 10/2009 | Goldberg | G01C 21/34 701/438 |
| 7,689,465 | B1 * | 3/2010 | Shakes | G06Q 99/00 705/500 |
| 7,769,221 | B1 * | 8/2010 | Shakes | G06Q 10/087 705/28 |
| 7,813,974 | B1 * | 10/2010 | Braum | G06Q 10/087 705/28 |
| 7,979,359 | B1 * | 7/2011 | Young | G06Q 10/06 705/28 |
| 8,560,461 | B1 * | 10/2013 | Tian | G06Q 10/087 705/332 |
| 9,751,693 | B1 * | 9/2017 | Battles | B25J 9/0084 |
| 10,259,651 | B2 * | 4/2019 | Gupta | G07F 17/13 |
| 10,325,238 | B1 * | 6/2019 | Vedas | G06Q 30/0635 |
| 11,157,331 | B1 * | 10/2021 | Wier | G06F 9/4881 |
| 2009/0265179 | A1 * | 10/2009 | Cunniff | G06Q 20/40 705/1.1 |
| 2013/0321857 | A1 * | 12/2013 | Asay | G06Q 10/0833 358/1.15 |
| 2014/0104414 | A1 * | 4/2014 | McCloskey | G01B 11/2513 348/135 |
| 2019/0098432 | A1 * | 3/2019 | Carlson | G06Q 10/083 |
| 2019/0188984 | A1 * | 6/2019 | Mclaughlin | G06F 16/90335 |

FOREIGN PATENT DOCUMENTS

| | | |
|---|---|---|
| WO | 2014118629 A2 | 8/2014 |
| WO | 2014187997 A1 | 11/2014 |
| WO | 2016059218 A1 | 4/2016 |
| WO | 2019081773 A1 | 5/2019 |

OTHER PUBLICATIONS

Extended European Search Report, dated May 21, 2021, for European Application No. 21154638.7, 7 pages.

Communication Pursuant to Article 94(3) EPC, dated May 20, 2022, for European Application No. 21154638.7-1218, 12 pages.

* cited by examiner

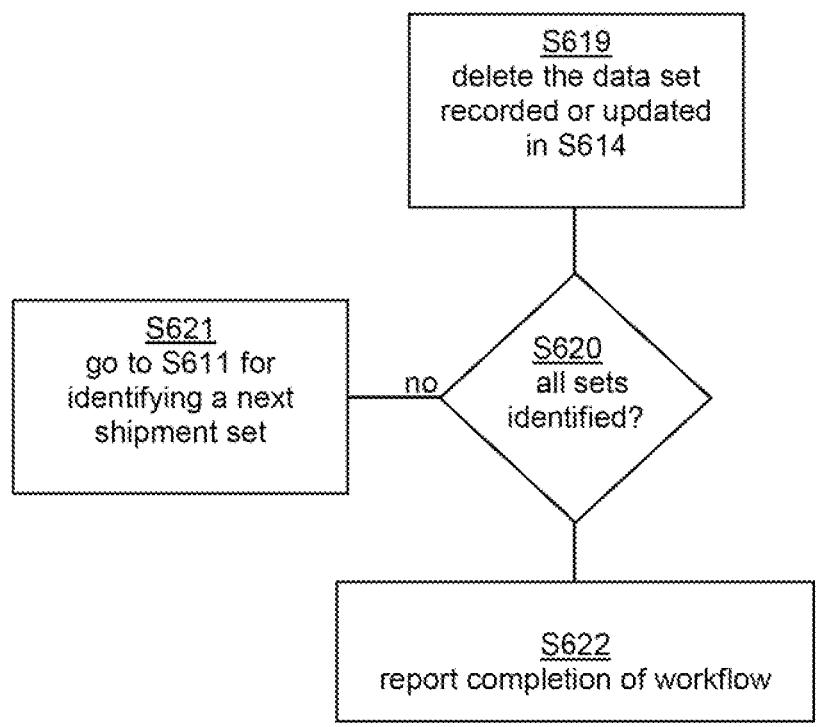

SYSTEM AND METHOD FOR ASSISTING ERROR RECOVERY IN AN AUTOMATED PACKAGING PROCESS AND SYSTEM AND METHOD FOR AUTOMATICALLY PACKAGING SHIPMENT SETS

TECHNICAL FIELD OF THE INVENTION

The invention relates to a system and a method for assisting error recovery in an automated packaging process of packaging shipment sets, i.e. sets of one or more items to be shipped, and in particular in an automated packaging process of packaging varying shipment sets, in which at least the number, and usually the number and the size of the items vary, in custom-sized boxes made from cardboard blanks. The invention also relates to a system and a method for automatically packaging varying shipment sets in custom-sized cardboard boxes employing the system and a method for assisting error recovery, i.e. restarting the process of packaging a shipment set respectively re-entering a shipment set to be packaged in the system for automatically packaging it.

TECHNICAL BACKGROUND

Mail ordering has become a widely used way of buying goods. More and more companies offer virtual department stores, in which the customers can electronically put goods in a shopping cart that later will be transferred by the respective company into a dispatch order so that in a warehouse a shipment set comprising the items ordered can be assembled based on the respective dispatch order. Typically, a thus assembled shipment set then transferred to and entered in a system for automatically packaging shipment sets in particular in custom-sized boxes.

For automated packaging of varying shipment sets, different systems have been proposed. One approach is shown in WO 2016/059218 A1, which discloses a system and a method for automatically packaging varying shipment sets, which system and method employ two separate packings, namely an inner packing surrounding the items to be packaged in a first direction, and an outer packing surrounding the inner packing in a second direction, said second direction being substantially perpendicular to the first direction such that the inner and the outer packing form a combined package enclosing the package items from all sides.

A different approach is shown in WO 2014/118629 A2 and WO 2014/117817 A1, which teach methods and systems that allow—within the boundaries imposed by the material used—creating a fully custom-sized box, i.e. a cuboid box, of which width, length and height are adapted to the respective content of the box.

Such systems create boxes by first obtaining information on the outer dimensions length, width and height of the shipment set to be packaged and calculating based on this information the layout of a custom-sized cardboard blank (sometimes called template or piano) comprising different so called panels, which are delimited from each other by crease lines or indentations and incisions allowing the panels to be folded in order to create the box wanted. A piece of cardboard supplied from a roll of cardboard or a stack of zig-zag cardboard is then cut-off, indented and incised (not necessary in this order) to form the blank. Depending on the specific way the system works, a box with or without an attached lid may then be formed automatically by gripping and folding the blank. In the "International Fibreboard Case Code" published by FEFCO and ESBO, 2007, 11th edition, many different box layouts are disclosed, some of which are easy to handle in automated packaging systems.

The system disclosed in WO 2014/117817 A1 has proven to allow packaging items varying in size and number fully automatically. Using a special box design as disclosed in WO 2019 081773 A1 allows packaging about 1000 and even more varying shipment sets per hour.

Automated packaging systems are with respect to the data available to them usually completely separated from a respective warehouse system and can be operated more or less independently of the warehouse system. Thus, an automated packaging system can be regarded as a "service provider" for the warehouse system respectively for a mail ordering retailer, and basically the packaging system does neither know nor understand which and how many items are comprised in a shipment set to be packaged (some special packaging instructions may be provided to the packaging system for example by specially marking certain items like breakable items, fluids, batteries etc. that may need a special packaging). The dispatch order containing the information, which customer ordered which items and to which address the respective shipments that shall be sent, is unknown to the packaging system. From the viewpoint of the packaging system, it just gets "something" (namely the shipment set) that has to be packaged and so called processing data which typically includes e.g. a print file for printing a shipping label, information for printing on the box, information for creating a box, information for using a specific cardboard type for the box, adding certain void fill, vouchers, samples, etc.

If in the process of packaging a shipment set, which process typically comprises ten and more different stages performed at a number of different stations through which the shipment set is transported, something happens to the shipment set before the box is finally closed and e.g. address information is printed or otherwise attached to the box, that is if for example a partially finished package gets somehow damaged and needs to be retracted from the system or an item falls for some reason out of the system, the problem occurs that the system does not know, which items actually belong to a specific shipment set and to whom this set has to be sent to. In other words: the shipment set and the processing data get separated. This problem can basically occur in any system for automated packaging of varying shipment sets that is operated without having the dispatch order readily available, i.e. in which an operator needs to identify one or more items, which somehow got out or have to be taken out of the automated process, as belonging to a specific shipment set.

In systems like those known from U.S. Pat. No. 7,689,465 B1 or U.S. Pat. No. 7,769,221 B1, where the packaging process is done manually and is visually documented for a customer, who ordered the item(s), this problem does not occur, as the person doing the packaging has everything including the dispatch order and address information at hand, and the visual documentation is done to be able to prove, what actually has been packaged. Nevertheless, just making a video of the packaging process would not help in cases, where the packaging system does not have the dispatch order but just the processing data.

As the speed of automated packaging system increases, the problem of error recovery increases. In high end packaging systems many orders can be in progress at the same time and may enter certain processing stations from multiple other stations that are arranged upstream, e.g. via a merge conveyor merging the streams of several stations, which makes it nearly impossible to for example maintain a specific order in which shipment sets were processed.

Also, in many cases no information like a pick list or a return form is part of the shipment set. A picking list may have been associated with a special tray for assembling the items, but this information (which is part of the dispatch order) is not handed over to the packaging system as mentioned above. If in that case a shipment set has to be retracted from the system and has to be reprocessed there are no means for the operator to associate it again to the correct processing data containing e.g. the shipping information.

In case multiple shipment sets have to be retracted, error recovery becomes far more difficult and error prone. Selecting each shipment set to be reprocessed from a list is not really a solution as an order number is typically not recognizable for an operator. With multiple items in a shipment set often the individual item information is not even known. For efficiency reasons usually not all the items within such an order are individually scanned at an entry station of a packaging system. In that case, it is also not possible to match individual items to specific processing data.

The situation becomes even more complex when the items of one order are split over multiple shipment sets. Depending on the amount and size of the items to be shipped an order may be split into multiple shipment sets. Usually there is however no more than one pick-list (if any), which is added to one of the packages for the shipment sets, e.g. the first or usually the last package. In case an error occurs, not all packages may be affected, e.g. the first package could already be processed successfully and is out of the packaging system. The situation may thus occur that an operator has to remove a shipment set that is only a part of an order. Bringing this shipment set back into the system and assigning the correct processing data with it is difficult.

In case of a system with an automatic feed of shipment sets the association between the processing data and a specific shipment set might even be completely unknown to an operator. In such a case there has to be some kind of support to feed shipment sets back into the system.

US 2013/0321857 A1 shows a method performed by a computer program operating on a computer system including displaying, by the computer system on a display screen in communication with the computer system, a plurality of data fields related to shipping a package and receiving, by the computer system, an identifier for the package, the method further including, in response to the receipt of the identifier, automatically populating, by the computer system, a data field from the plurality of data fields with data for the package from a device in communication with the computer system, and displaying, by the computer system, the populated data field on the display screen.

EP 3 200 036 A1 shows a hardware as illustrated in FIG. 1 and a related method for optimizing automated packaging.

DISCLOSURE OF THE INVENTION

In view of the aforementioned problems, it is an object of the invention to provide a system and a method for assisting error recovery in an automated packaging process of packaging shipment sets by facilitating re-entering respectively reprocessing one or more items of a shipment set that for some reason have fallen or had to be taken out of the packaging process, because when that happens, the link between the processing data like in particular information, to whom one ore more items have to be sent, and the item(s) is lost. Thus, the invention aims at providing a technical concept of improving the operation of systems for automated packaging in terms of facilitating failure handling. The invention likewise aims at improving the reliability, speed and efficiency of operation of systems for automated packaging.

The invention is defined in the claims.

The processing data for the shipment set to be processed can be obtained in multiple ways when the shipment set is entered, and the invention advantageously allows using the most appropriate way of obtaining that data. If for example the shipment set arrives on a special tray at the entry stage, the tray may have a machine-readable data carrier associated with it that either already contains the processing data or carries a code with which the processing data can be retrieved from a database.

The representation of the shipment set can be acquired in multiple ways, and again the invention advantageously allows using the most appropriate way of acquiring such representation. For example, an image of the complete or parts of the shipment set may be taken and/or RFID tags, barcodes, QR codes etc. of one or more items of the shipment set may be taken. It is also possible that the representation comprises a combination of images, scanned and otherwise acquired information. If technology such as scanning RFID tags of each item in a shipment is used, this will also enable an automatic check upon entering or re-entering a shipment set in the packaging process if the shipment set is complete.

The dataset, in which the unique processing set identifier is associated with the processing data of said shipment set and with said representation, is recorded in a machine-readable memory, from which it can be retrieved when needed and from which it may be removed as soon as the packaging process for the respective shipment set is fully completed.

As explained above, many different processing errors can occur in the automated packaging process that affect a shipment set. For example, a box already containing the shipment set may get damaged and needs to be taken out of the process, or one or more items may somehow fall out of the process prior to being packaged. As the link between the processing data and the respective item(s) is then lost, for error recovery a collection of datasets of each shipment set potentially affected is obtained, typically upon request of an operator, who wished to re-enter the item(s) in the packaging process. Depending on the circumstances, the collection may comprise only a few (even only one) or many datasets. For example, it may be known (as will be explained later), in which of the multiple processing stages an error occurred, and in a preferred embodiment the datasets are continuously updated with information about the processing stage in which a shipment is, so that the collection of datasets may only comprise datasets of shipment sets in that stage. In other embodiments, the collection may be obtained based on knowledge about the time and the processing speed and/or about the number of shipment sets handled, and with that knowledge, it can be automatically determined, which shipment sets should be in which processing stage and hence could be affected by the error.

Configuring a user interface at the entry stage with the representations of the shipment sets in said collection for allowing selecting an affected shipment set may be done for example by displaying e.g. on a touch screen images of the shipment sets or a list of items belonging to each shipment set. The images may be those taken at acquiring the representation or may be automatically created based on e.g. information scanned using RFID technology at acquiring the representation.

An operator may then select via the user interface a shipment set for re-entering and re-enter the item(s) of the affected shipment into the automated packaging process using the processing data recorded in the dataset of the selected shipment set. In doing so, a new unique processing set identifier may be assigned to the shipment set or the existing one may be used. Also, a new representation of the shipment set may be acquired and a new dataset may be recorded by associating said unique processing set identifier with the existing processing data of said shipment set and with new or existing representation. In any case, the link between the existing processing data and the one or more items that have to be re-entered in the packaging processed is restored.

Advantageously, the invention allows handling the re-entering rather flexibly. An operator may decide to do it directly when an error occurs or to first process a number of shipment sets that are in progress. Typically, on an operator display information will be provided about affected shipment sets.

In some cases, it may be noticed that at a certain processing stage something does not work properly, for example boxes may get damaged while still being able to be further processed. In such case, an error message may be created and using the recorded datasets the representations of potentially affected shipment sets may be displayed to an operator so that he can retract the shipment sets from the packaging process and re-enter them.

Typically, the method is used at complex systems for automated packaging having multiple entry stations where entry stages are performed. In that case, it may be foreseen that the datasets also contain information about at which entry station a shipment set entered the packaging process. It may also be foreseen that there all items or complete shipment sets that need to be re-entered are handled at a certain designated entry station.

The progress of the packaging process is tracked by updating the dataset with a processing stage identifier. At each stage, the entering or leaving shipment set may be identified, for example simply by counting the number of shipment sets that have already passed the respective stage, so that it is known, which shipment set is in which stage. This information may be added or assigned to the dataset of the respective shipment set, so that when an error occurs in a certain stage, the potentially affected shipment sets can easily be identified and corresponding information for example about shipment sets to be retracted from the process may be presented to an operator for example by showing pictures of the respective sets. Such information may be presented at the entry station or at a station, where the respective stage is performed. In order to facilitate this, said obtaining of a collection of datasets of each shipment set potentially affected may comprise identifying those datasets that comprise a specific processing stage identifier. If it is known, at which stage an error occurred, an automated alarm indication at said stage may be triggered, i.e. a warning lamp at the station performing the stage may be turned on.

In an embodiment, acquiring a representation of the shipment set may comprise acquiring a representation of each item in the shipment set, which allows that upon configuring the user interface with the representations of the shipment sets in said collection, similar or identical representations of several shipment sets may be grouped on a first display level and representations of other items in a shipments set may only be shown on a second display level upon selecting a representation on the first level. For example, if the representations are pictures and if the packaged shipment sets typically comprise many items, it could be difficult for an operator to identify a specific shipment set by looking at a picture of the entire set. In such case, pictures of similar or even identical items in different shipment sets may be grouped together, for example a group "books" and a group "CDs" may be formed, and each group or a representative (e.g. an icon) for each group may be shown to the operator in a first step (called first level display). If the operator tries to re-enter a shipment set comprising amongst others a book, he may click on the book icon and gets then presented (as so called second level display) pictures of all shipment sets comprising books and determining the correct shipment set is made easier by reducing the number of possible choices. Of course, if the shipment sets are very complex, this may be done in multiple steps, that is a third, fourth etc. display level may be foreseen. Once a first item of a shipment set is selected, only items belonging to the same shipment set may be selected. If items are not unique over shipment sets, the presented representations are restricted to those present in a shipment set comprising the items selected so far until a complete shipment set is selected, which is then available for reprocessing.

If the items in the shipment sets are equipped with RFID tags, the process of re-entering a shipment set that got somehow out of the packaging process can be further or even fully automated. If upon acquiring a representation of the shipment set the RFID tag of each item in a shipment set is scanned, an RFID tag profile is obtained as said representation, and configuring the user interface may then comprise scanning the RFID tag of at least one item of a shipment set that shall be re-entered, upon which the shipment set is automatically identified and the correct dataset is assigned to it.

Further details and advantages of the invention will become apparent from the following detailed description of embodiments in conjunction with the drawing, which comprises ten drawing figures.

DESCRIPTION OF PREFERRED EMBODIMENTS

Figure 1:
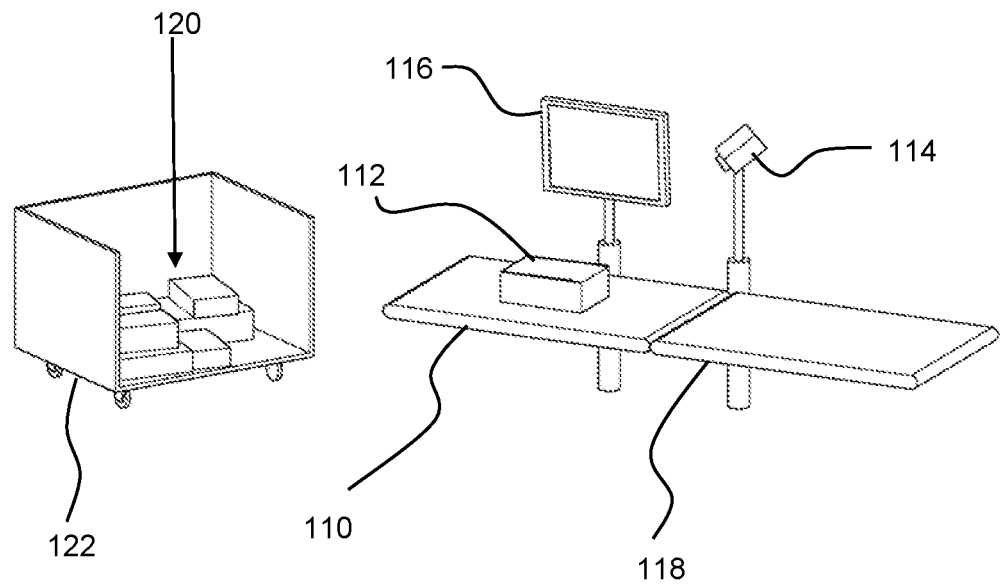
FIG. 1 illustrates items and hardware at an entry of a system according to or operated according to the invention.

FIG. 1 schematically shows a very simple entry station of a system for automated packaging shipment sets. The station comprises a conveyor 110 on which an item 112 of a shipment set is placed. The station is equipped with a camera 114 for obtaining an image of the item and with a display 116, and is arranged upstream of an entry conveyor 118, which transports a shipment set into a system for packaging. In this case, the items forming the shipment sets are taken manually by an operator from a set of shipment sets 120 provided via a cart 122.

Figure 2:
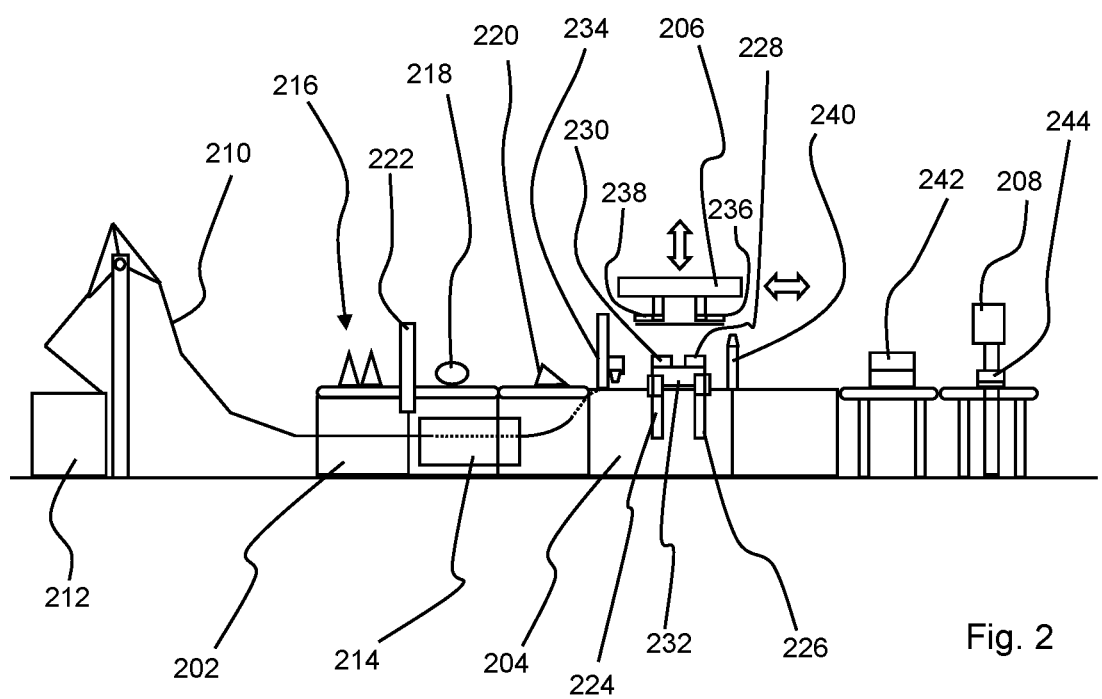
FIG. 2 is a schematic view of a prior art system which or the operation of which is to be improved according to the invention.

One or more stations as illustrated in FIG. 1 may be foreseen in a complex packaging system and provide shipments sets arranged by an operator via the entry conveyor 118 to a receiving unit 202 shown in FIG. 2, which basically shows a conventional system of WO 2019/081773 A1 the disclosure of which document is herewith incorporated entirely by reference.

The system shown in FIG. 2 provides a sequence of processing stages with receiving unit 202, the combination of a folding station 204 and a lid placing station 206 and a final processing section and the labelling unit 208.

Cardboard 210 is supplied from a stack 212 of zig-zag folded cardboard to a station 214 for cutting the cardboard, punching out slots between corner panels and side panels and introducing crease lines to delimit respective panels from each other and to thus produce a blank for a custom-sized box. The respective dimensions of the panels are calculated using a calculating unit, which can form part of a control unit for controlling the complete system and which may for example be integrated in the receiving unit 202, where shipment sets like the items constituting the shipment sets 216, 218 and 220, which shall be packaged, are placed. The items to be packaged are transported via conveyor belts through a laser scanning unit 222, which measures the outer dimensions of the items passing through the unit in order to obtain information on the desired inner dimensions length, width and height a box needs to have in order to receive the items or the arrangement of items as they are, i.e. without re-arranging the items. The cardboard blank is transported from the cutting and creasing station 214 to the folding station 204, where the item or the items to be packaged are put on top of a bottom panel of the respective blank cut and creased in the cutting and creasing station. Respective grippers and folders like the gripping and folding units 224 and 226 fold the box around the item(s) to be packaged. In this case, the box layout comprises so called side panels, end panels and corner panels. Two corner panels 228 and 230 are folded upwards, then the end panels are folded inwards thus folding also the corner panels inwards and finally the side panels, of which side panel 232 is visible in this view, upwards.

When the respective blank is transported from the station 214 to the station 204, it passes a glue application unit 234, which applies hot melt glue to the parts of the side panels, which are to be brought into contact with the corner panels.

To close the box, in this embodiment the lid placing station 206 is provided, which as indicated by the double-sided arrows is moveable upwards and downwards, forwards and rewards in the transport direction of the items respectively the boxes. Similar to the blanks for the box, based on the calculated dimensions a blank for the lid is produced and picked up by the lid placing station 206 for example with suction grippers that can be integrated in respective folding units 236 and 238 of the lid placing station. A gluing unit 240 applies hot-melt glue to the end panels and the side panels of the lid, which is placed on top of the box that just has been erected, upon which the end panels and the side panels of the lid are folded downwards. The thus closed boxes 242, 244 are then transported via respective conveyor belts to the label printing and application unit 208, which puts a label including for example address of the recipient and postage on the boxes, which then can be picked up and further transported. The lid can be created from the same cardboard supplied as the box, in case of which the cutting and creasing station may be set up to produce not only a blank for the box, but also a blank for the lid, which may then be transported via respective conveyor belts to the lid placing station, which picks up the lid and puts it on top of the box. It should be understood that the system shown in FIG. 2 is presented for facilitating understanding the packaging process and is of rather simple nature. Modern high speed packaging systems that allow packaging 1000 and more shipment sets per hour perform typically between ten and twenty stages of a packaging process.

Figure 3:
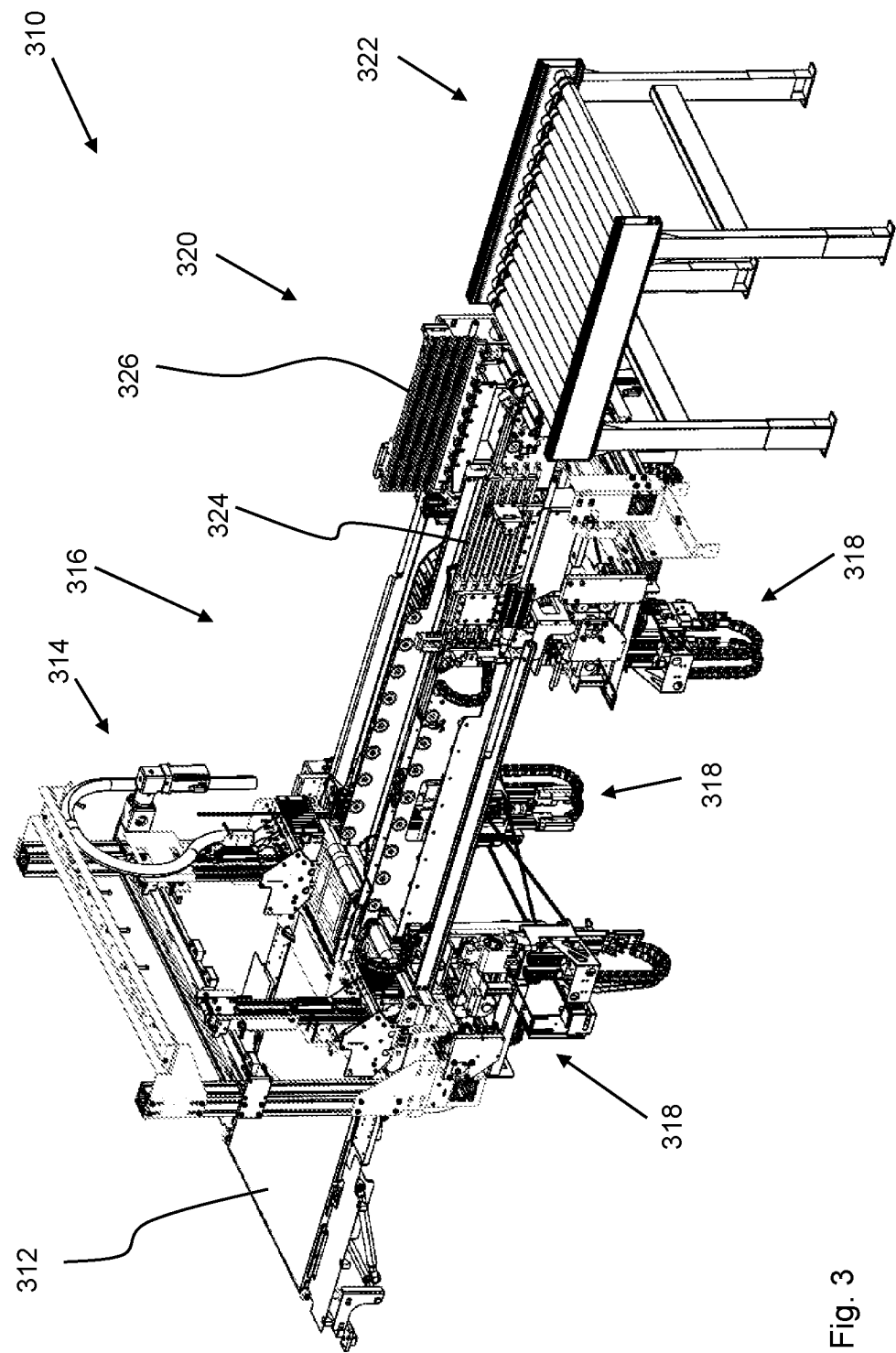
FIG. 3 is a schematic perspective view of parts of a system for automatically packaging varying shipment sets in custom-sized cardboard boxes.

FIG. 3 shows parts of a system 310 for automatically packaging varying shipment sets in custom-sized cardboard boxes, namely an input or assembly station 312, where during operation shipment sets are placed on a custom-sized cardboard blank having a layout like the one shown under item 0300 in the aforementioned International Fibreboard Case Code, a glue application station 314, where glue is applied to parts of the side panels of the blank that will come in to contact with the respective corner panels, a folding station 316 comprising four folding units 318 adjustable in their position to handle differently sized blanks, a curing station 320 and a pick-up station 322, where the final folded boxes arrive when the glue has cured and are picked-up for further processing. The curing station 320 comprises holding structure for form-fittingly holding the side panels of a box erected in the folding station 316 and for guiding the boxes through the curing station. The holding structure comprises in particular two side guiding elements 324, 326 that are substantially parallel to each other while the distance between them is adjustable to different box widths.

Figure 4:
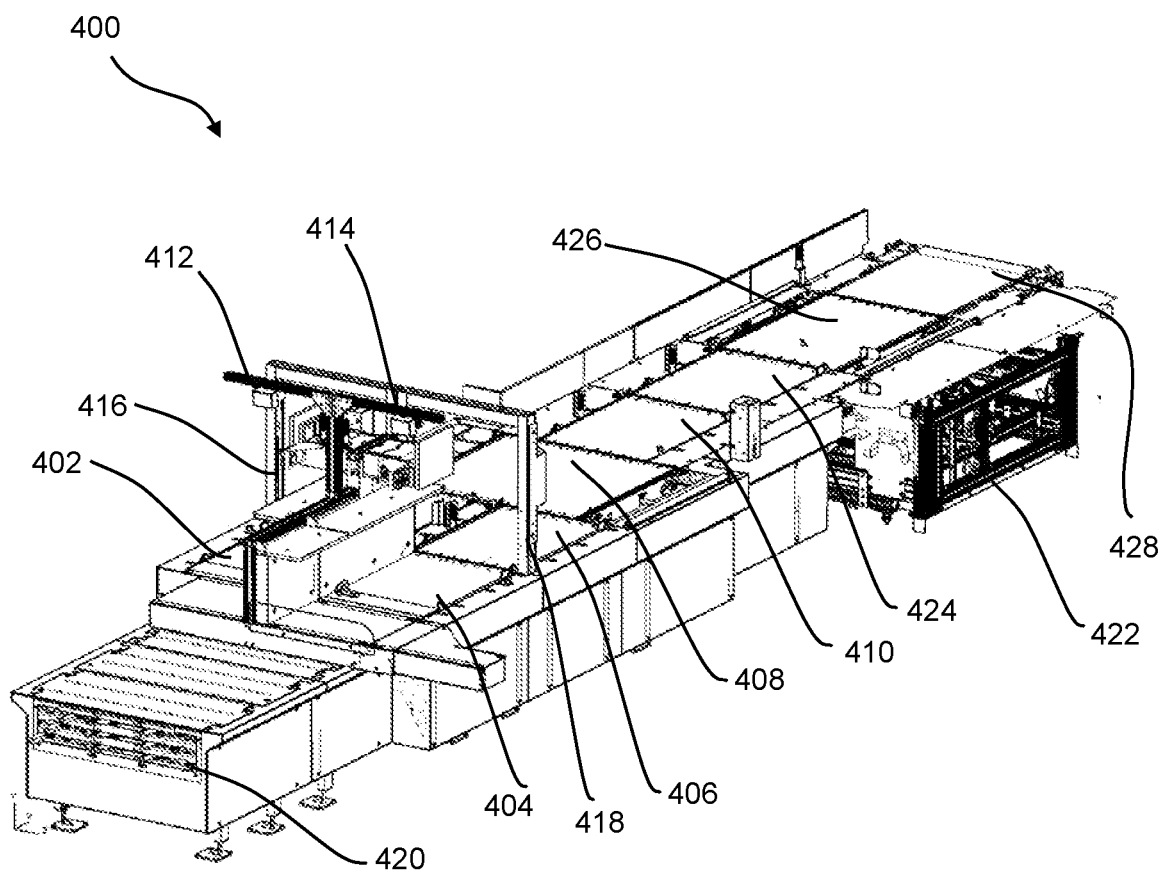
FIG. 4 is a schematic perspective view of further parts of a system for automatically packaging varying shipment sets in custom-sized cardboard boxes.

FIG. 4 shows schematically the general layout of the entry part 400 of a more complex packaging system comprising in this case two entry stations, where items of shipment sets are arranged manually or automatically for example by using robotic placement stations and or automatic feed mechanism. Each entry station comprises a first conveyor 402 resp. 404 associated with respective second conveyors 406 (of which only one is visible), which are preferably conveyor belts and are configured to transport the respective item or items arranged directly on them or loaded onto them towards a third conveyor 408, which comprises preferably also a conveyor belt and which is configured to transport the items towards a fourth conveyor 410 while being itself moveable in a direction between the second conveyors 406. The third conveyor 408 thus allows merging the flows of arrangements of one or more items from the entry stations and is thus also called a merge conveyor.

System 400 also includes a first barcode scanner 412, a second barcode scanner 414, a first 3D scanner 416 for identifying the dimensions of an arrangement, a second 3D scanner 418 for identifying the dimensions of an arrangement, a cardboard entry 420 for feeding cardboard into the system 400 and a cut and crease unit 422 for creating box templates.

In this embodiment, the second conveyors 406 serve as "queueing conveyors" where shipment sets can wait for being transported onto the merge conveyor 408.

Downstream of the queueing conveyors is the merge conveyor 408 that can receive shipment sets from both queueing conveyors. After the merge conveyor 408 there are in this embodiment two conveyors 410, 424 followed by the align conveyor 426, which is followed by another conveyor 428. Below the conveyors are cardboard tracks. Below the align conveyor 426 and the conveyor 428 is the cut and crease unit 422 for creating a custom-sized cardboard blank in a manner known in the art.

Figure 5:
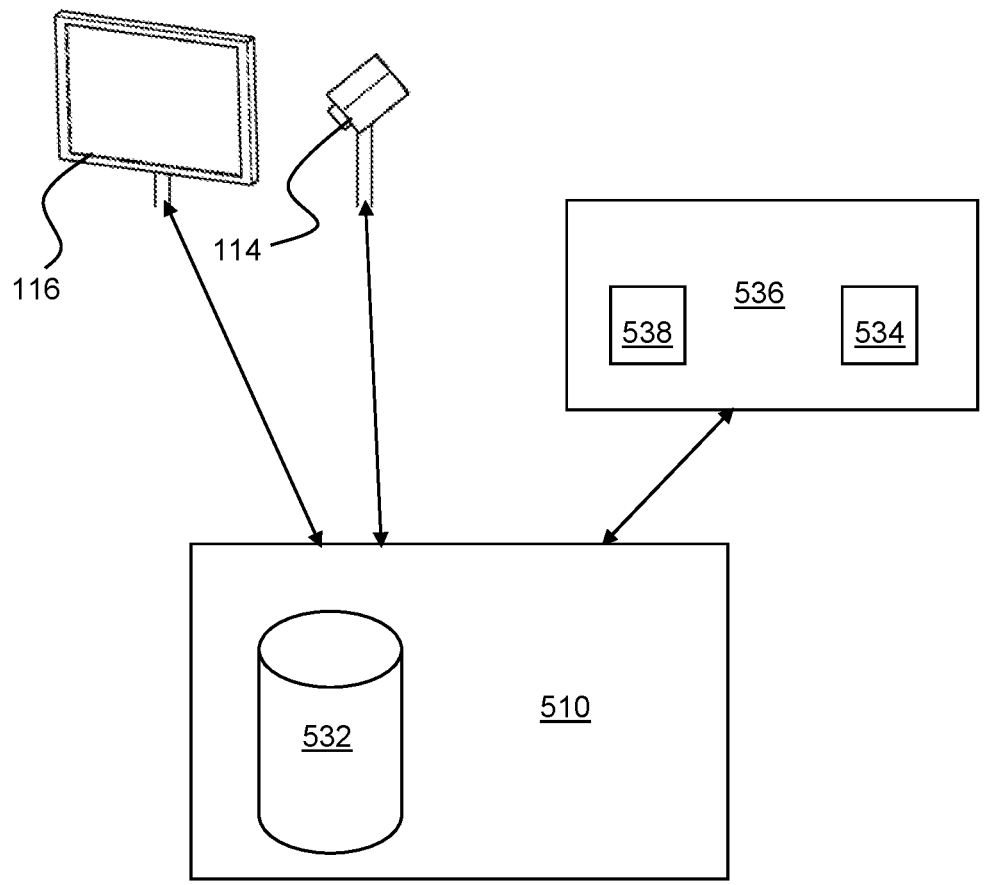
FIG. 5 is a schematic view of a computer according to one embodiment along with peripheral devices.

FIG. 5 is a highly simplified schematic drawing for explaining some basic functionalities and illustrates with double arrows communication links, which may be wired or wireless communication links, between a computer 510 and peripheral equipment controlled by the computer which includes the display 116 and the camera 114 shown in FIG. 1, and further includes an error function entity comprising a failure detector 536, which may be a further computer, and controls an inspection unit 534 and a visual alarm indicator (a warning light) 538 for providing a visual alarm. The inspection unit 534 may be a tag reader or light barrier which may be placed at the entrance or the exit of a processing station forming part of a complex packaging system. The error function entity is placed and configured for surveying detection of a shipment set by the inspection unit 534 at a predicted time to thus allow an indication of the integrity of packaging operations, to trigger an alarm in case of detecting a failure and to output a visual indication using the warning light 538 arranged next to the inspection unit 534 so that the visual alarm allows signalling to an operator that a failure/an error has occurred. The failure resp. error may of course also be indicated on the display 116.

The computer 510 controls its peripheral equipment with programmable logic controllers and in particular the failure detector 536 comprises a programmable logic controller.

In a preferred embodiment, processing stages contain only one shipment set at the same time, which advantageously means that at a failure incident in a processing stage only a single shipment set has to be retracted. Warning lights 538 are used to inform an operator from which processing stages shipment sets have to be retracted.

Specifically, the computer 510 provides high level control and interfacing with the environment and programmable logic controllers for control of the system of the invention. For this purpose, it is commonly known to connect monitors to the computer 510, just like the camera or to programmable logic controllers with a communication link to interface sensors and/or actuators/motors.

The above mentioned detector 536 exemplifies only one of a set of suitable sensors and many of such sensors are arranged along a processing path of a packaging system and used to monitor the performance of all the different processing stages. The functionality of the computer 510 of the controlling programmable logic controllers uses information available from the sensors to detect if shipments sets are subjected to the processing stages as expected or if an error situation is detected.

If an error situation is detected the computer 510 may determine the processing stage where this occurred and may determine which actions are needed to prevent further damage, and if possible which part of production can be continued and finished. In this context it executes and profits from a function of cancelling a shipment set to one or more or all still scheduled processing stages.

A further function of the computer 510 may be that for shipment sets in progress, which have passed the processing stage where the error occurred, finishing the processing by the system for automated packaging is authorized.

A further function of the computer 510 may be that for shipment sets that are upstream the processing stage where the error occurred, subjecting them to scheduled processing stages is cancelled and stopping at a controlled position in the processing sequence is caused.

An error at one processing stage can thus lead to multiple follow-up errors on different processing stages, i.e. a need of intervention by an operator to remove all shipment sets from the erroneous processing stages from the machine. In order to assist an operator in selecting the shipment sets to be removed the system can provide instructions to the operator which shipment sets to remove from the system.

A visual alarm indicator 538 as shown in FIG. 5 may be provided at each of various or all processing stages of a packaging system and/or provided on the display 116 to give feedback to the operator whether to remove a shipment set from the system or to leave it in place for continued processing.

Re-entering items or complete shipment sets into the system can be facilitated by the invention. Sensor-based functions may notify the computer 510 which processing stages were in an erroneous state. The computer 510 may then determine from the recorded datasets, which shipment sets were affected and provide feedback on the display to support the operator in reprocessing these shipment sets. For all the retracted shipment sets the computer 510 may display images or other suitable information to identify the shipment sets on a man-machine interface like display 116 which may be a touch panel.

Figure 6A:
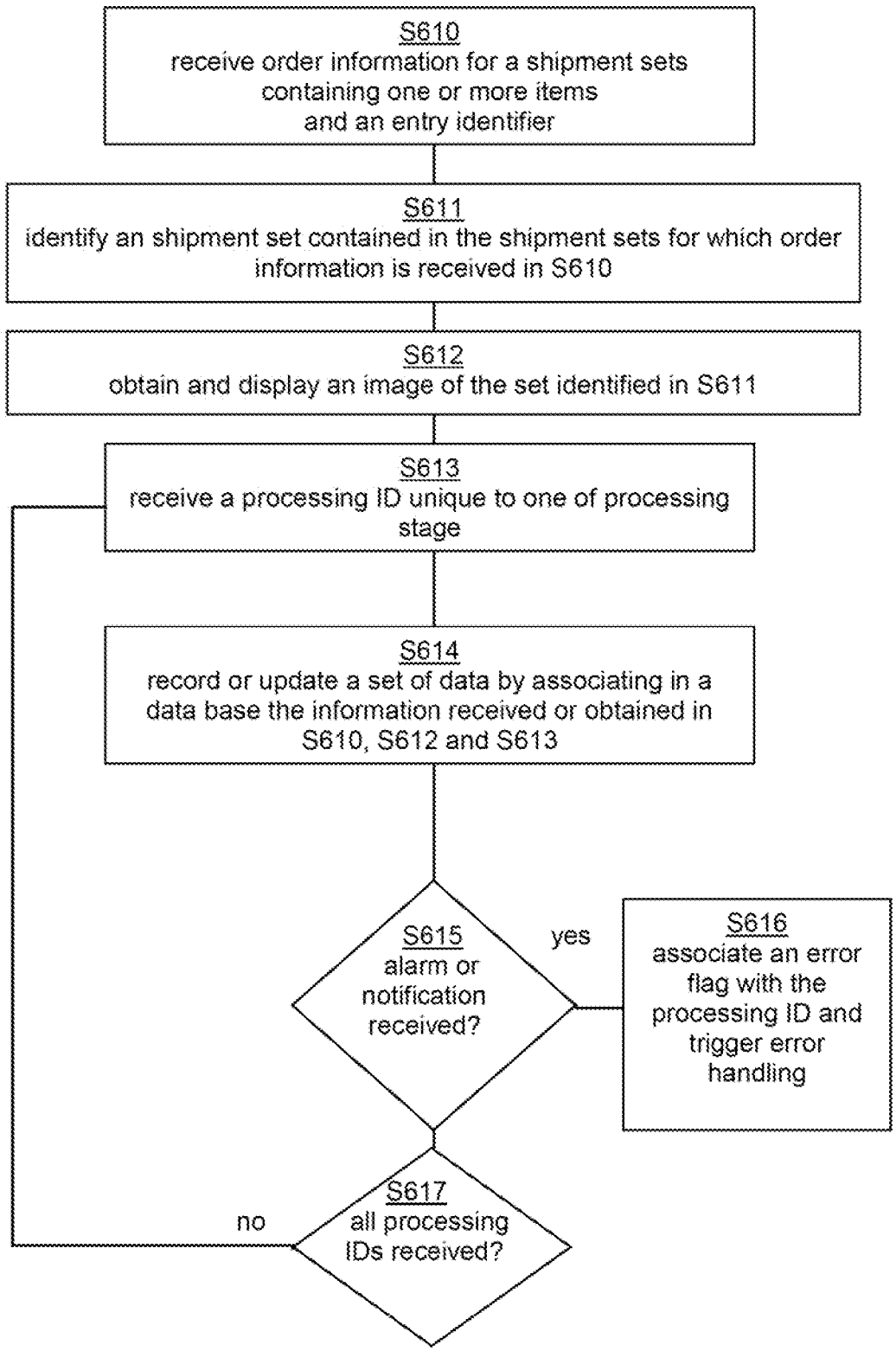
FIG. 6 is a flow chart illustrating an embodiment.

FIG. 6A shows one embodiment of a method flow which continues in FIG. 6B. In FIG. 6A a step of S610 sequentially receiving order information for shipment sets containing one or more items prior to a loop but sequentially receiving order information for shipment sets containing one or more items may alternatively be a function of the loop which in the illustration in FIG. 4A, 4B just returns to S11.

Steps S611, S612, S613, S614, S615, S617, S619, S620, S621 in FIGS. 6A, 6B form a loop in which via e.g. the camera 114 the computer 510 executes for shipment set by shipment set in step S612 obtaining an image of the shipment set fed into a system for automated packaging.

During normal operation of the system the computer 510 generates with an elapsed time-based and/or sensor-based functionality processing identifiers related to handing over the item from processing section to processing section. From this functionality the computer performs step S613 of receiving a processing identifier unique to one of processing stages which correspond to the system's processing sections. Using the database 532 the computer performs step S614 of forming a set of data by associating and/or storing the order information received for the shipment set containing said item with said image and said processing identifier via a data structure. Alternatively, an at least partially external database may be used for this purpose.

In normal operation steps S617, S613 and S614, i.e. via the NO route in step S615, are used to update the processing identifier along with a downstream forwarding of the item in the system towards a labelling unit. In other words, receiving a further processing identifier unique to a further one of said processing stages is performed including replacing said processing identifier by said further processing identifier in said set of data if said further one of said processing stages is a non-final processing stage via the NO route in step S617. If said further one of said processing stages is the final processing stage at the labelling unit 208 the YES route in step S617 is taken to proceed with steps illustrated in FIG. 4B. Then the computer 510 performs in step S619 deleting images of each set of data containing said processing identifier or the image pertaining to said set of data so as to reduce the number of displayed images on display 116. After exiting the above mentioned loop at the YES route of step S620 the computer 510 performs step S622 of reporting workflow completion. The reporting may be done by generating and sending an email to a customer or supervisor of a logistics centre and/or to the operators display 116. Alternatively step S622 may be performed between steps S619 and S620.

Outside normal operation an upon notification or alarm triggering with sensor-based functions or a predicted arrival check function using detector 536 as explained above in context with FIG. 5 the YES route is taken in step S615 to associate in step S616 an error flag with the processing identifier in the set of data recorded or updated in step S614. It thus triggers error handling by selecting a data set with a processing identifier unique to one of said processing stages stored due to said loop in response to a notification or detection of an alarm in step S615 related to said one of said processing stages. In this case the computer further triggers error handling by above explained functions of outputting information to a user interface, visual indicator operation and stopping so that an operator can react. This functionality starting in step S616 is preferably expanded by outputting to said display 116 or allowing retrieval of at least one of the selected processing identifier, an optionally visual tracking information based on the selected dataset and an instruction to remove items subjected to processing by said one of said processing stages and/or to reprocess them using the system for packaging items.

With a system having a plurality of entries for receiving shipment sets, said step S614 of forming a set of data further comprises associating and/or storing an entry identifier unique to one of said entries at which said a shipment set is fed into the system with said processing identifier via said data structure in the database 532. Then the functionality starting in step S616 is preferably expanded by generating and displaying at the display 116 an instruction to the operator reprocess shipment sets subjected to processing by said one of said processing stages includes an instruction to reprocess with feeding these shipment sets into another one of said entries. This may be done along with presenting a graphical user interface having said image and allowing said retrieval via selecting said image on said graphical user interface. The operator can then click onto the image to retrieve order information or even further information at which processing section or stage an error happed in the system.

As described in part already above the, error function entity illustrated in FIG. 5 comprises
- a function of detecting a failed processing stage at said processing section equipped with said error function entity and triggering said detection of an alarm,
- a visual indicator 538 and a function of switching-on the display 116 state on said display and of triggering said detection of an alarm by the computer 510, and
- a function of triggering stopping said packaging of items upon detecting said failed processing stage at said processing section equipped with said error function entity.

As is apparent for an expert in the art from the disclosure herein, in the process of handling and packaging shipment sets a lot of steps are performed in the different stations in parallel. In order to describe the process flow, in the following the process flow is described as a number of parallel flows shown in FIGS. 7, 8, 9 and 10. One flow is the so called induction flow of orders, i.e. the entry and feeding of new orders into the system, which is shown in FIG. 7.

Figure 7:
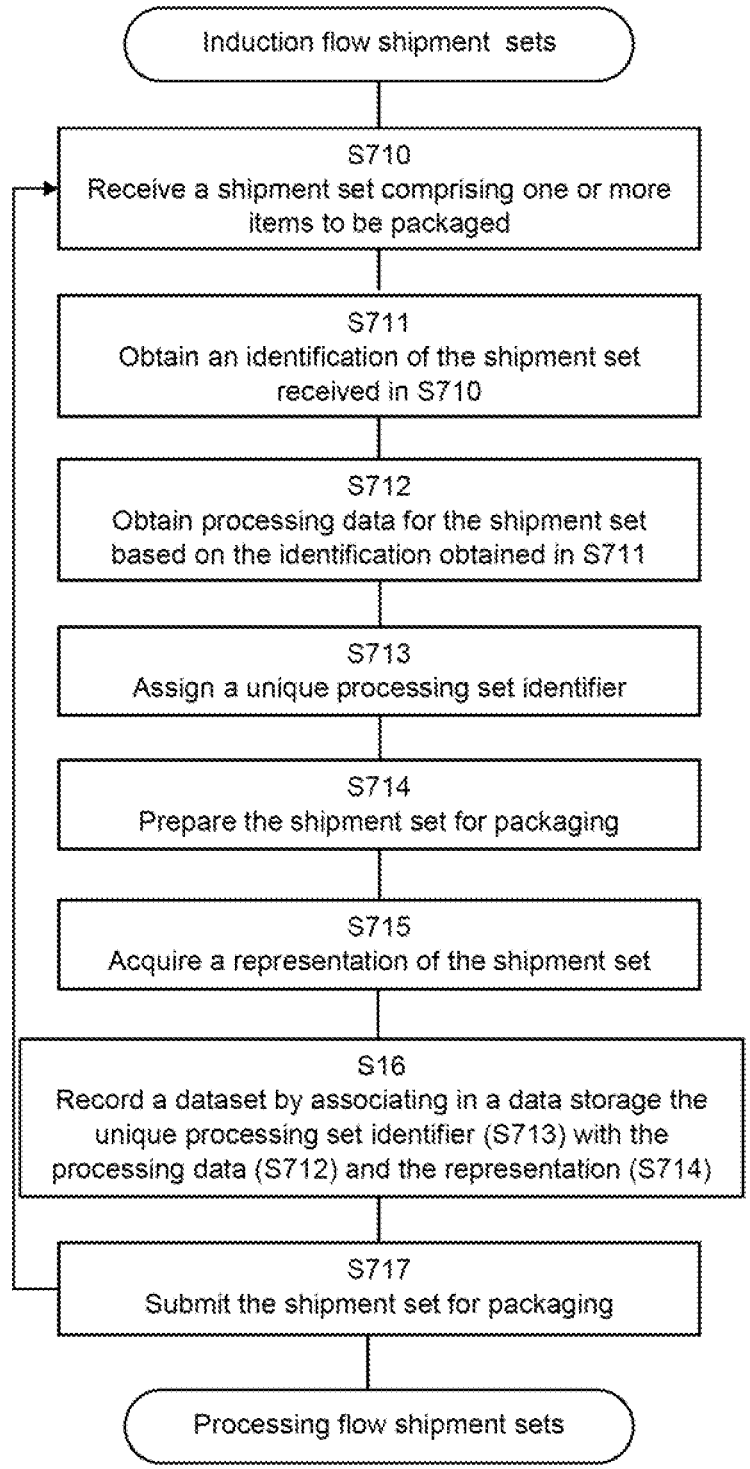
FIG. 7 is a flow chart illustrating the induction flow.

As shown in FIG. 7, the induction flow in this embodiment comprises a step of receiving a shipment set comprising one or more items to be packaged (step S710). In step S711, an identification of the shipment set received in S710 is obtained when the shipment set is received, which may be done in multiple ways, for example with a barcode, a number, an RFID-tag or multiple other ways.

With the identification, the system obtains processing data (step S712) like in particular a print file. For the system, this file may just be some information it needs to put on a closed package for example, or information regarding special treatment of the shipment set like for example using a specific packaging material. The system then assigns (step S13) a unique processing set identifier, which is separate from any information that may be present in a warehouse system and is used internally for the following process steps.

In step S714, the shipment set is prepared for packaging, i.e. items forming the shipment set are arranged on a transport belt either manually or automatically. In step S715, an image or another representation of the shipment set is created.

In step S716, a dataset is recorded in a data storage (a computer memory) by associating in a data storage the unique processing set identification obtained in step S713 with the processing data obtained in step S712 and the representation obtained in S715. The shipment set is then submitted (transported) for packaging (step S717).

Figure 8:
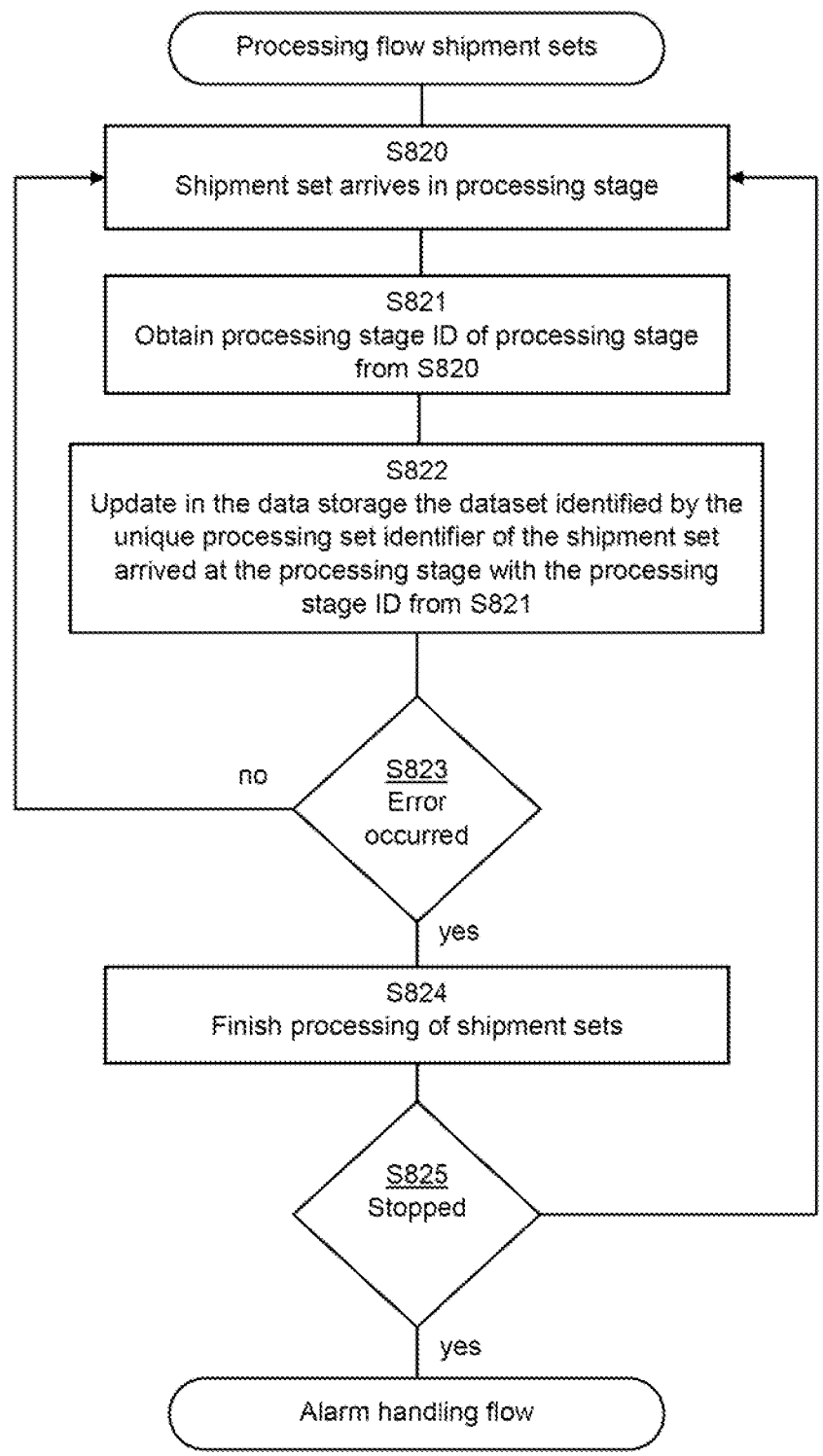
FIG. 8 is a flow chart illustrating the processing flow.
Figure 9:
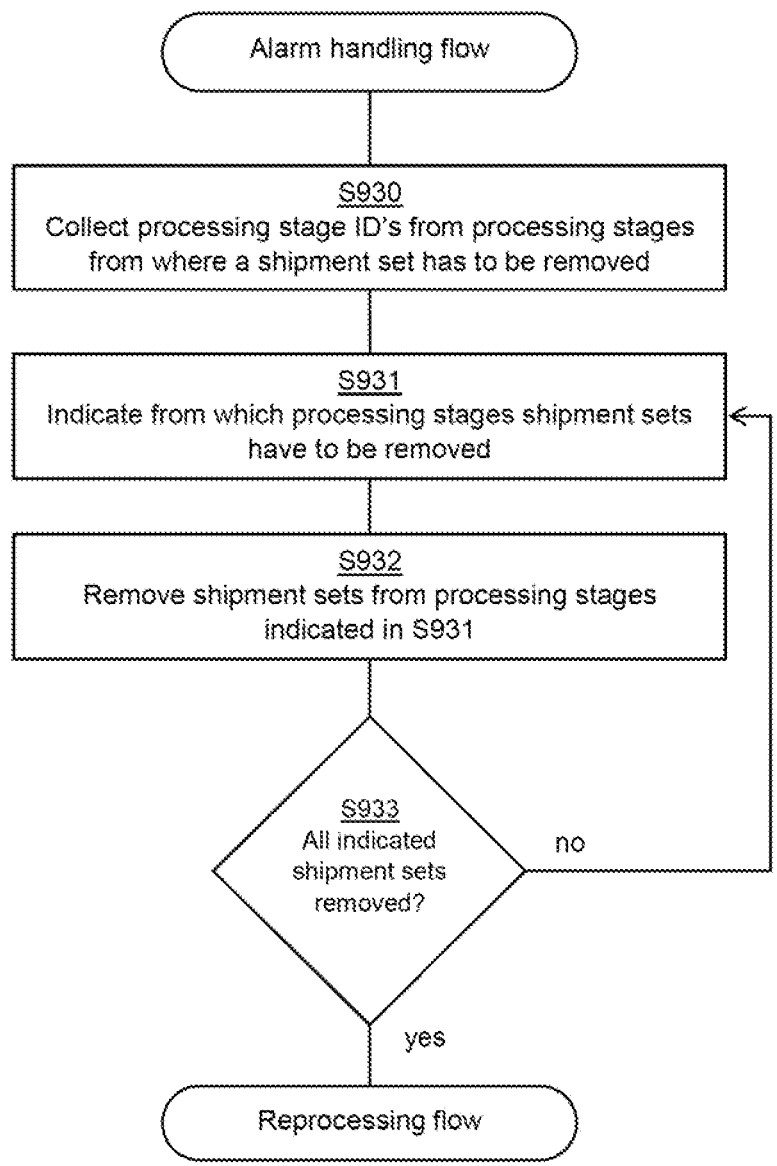
FIG. 9 is a flow chart illustrating the alarm handling flow.

This process is continuously repeated for new shipment sets, and the shipment sets that have been treated are transported for being packaged in different processing stages as shown in FIG. 8.

In this embodiment, in step S820 a shipment set arrives at in a processing stage. In this embodiment, in step S821 a processing stage identifier (ID) of the respective processing stage is obtained and in the data storage the dataset identified by the unique processing set identifier of the shipment set arrived at the processing stage is updated with the processing stage ID from step S821. Thus, in this embodiment the dataset always contains information, in which stage a respective shipment set is. Typically, several shipment sets may be in the same processing stage at the same time.

In step S823 it is checked, if in the specific stage an error occurred. This can be done in different ways, for example by checking, if the shipment set arrives at the end of the stage within a certain time period, or by sensors supervising e.g. the positioning of certain elements for folding a box. Thus, it may be that in a certain stage an error is detected at a certain point, which does not affect shipment sets in the same stage but downstream of that point. If no error is detected, the shipment set may be transported to a next processing stage were the steps S820 to S823 are repeated until the shipment set arrives at the end of the packaging process (not shown in this schematic diagram). If an error occurred, the processing of other shipment sets that may be downstream of the point, where the error occurred, or that are in stages downstream of the stage, where the error occurred, may be finished. A respective station performing the stage is then stopped and an alarm handling flow shown in FIG. 9 starts.

Figure 10:
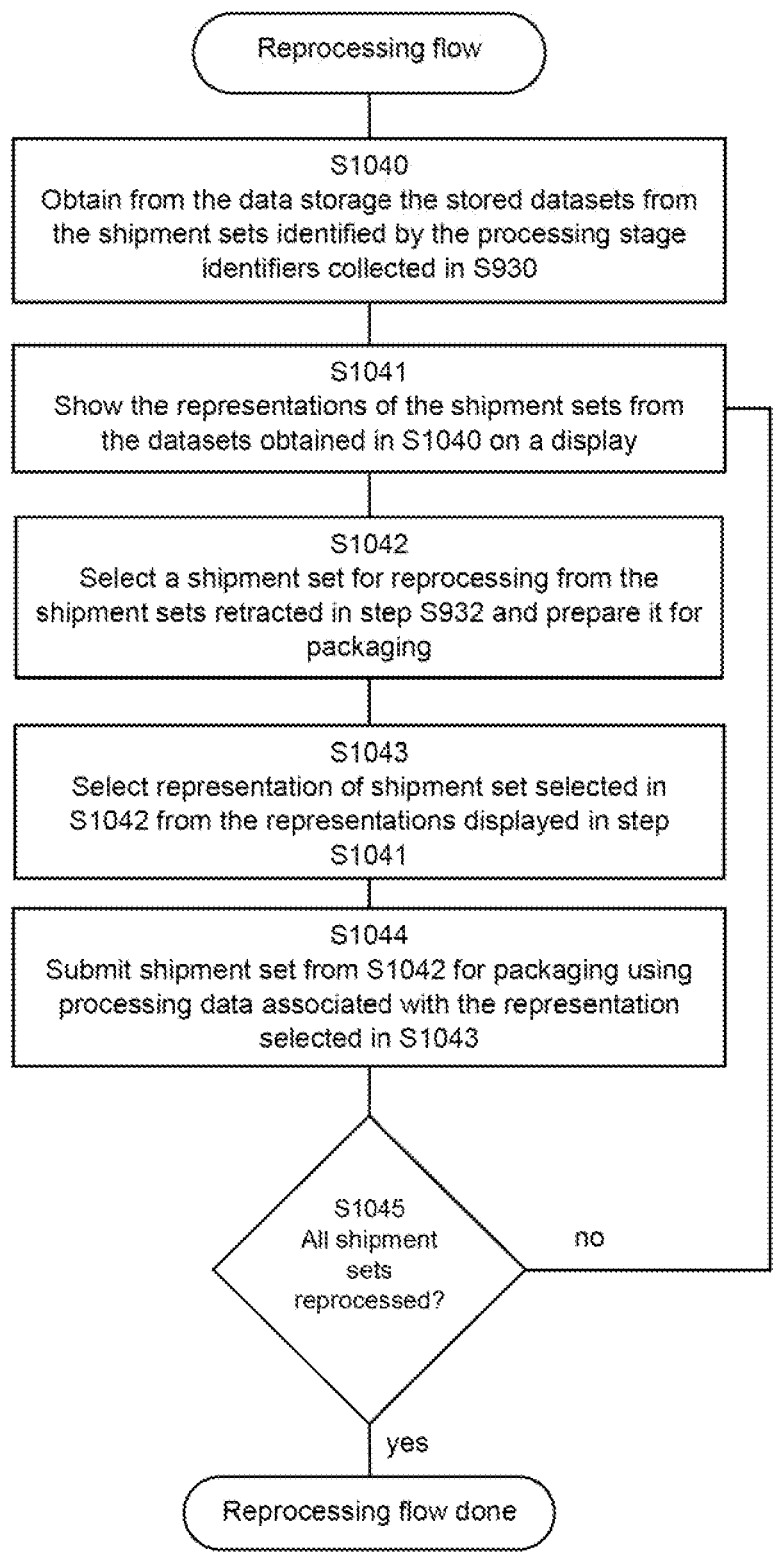
FIG. 10 is a flow chart illustrating the re-entering flow.

The alarm handling flow in this embodiment comprises a step S930 of collecting processing stage ID's from processing stages from where a shipment set has to be removed and a step S931 of Indicating to an operator, from which processing stages shipment sets have to be removed. The operator then removes (step S932) the respective shipment sets from the processing stages indicated in step S931. In step S933 it is checked, if all indicated shipment sets have been removed. If not, the steps S931 and S932 are repeated. If all indicated shipment sets have been removed, the reprocessing flow starts and the stopped processing is continued (not shown) with the shipment sets that are still in the process of being packaged. The reprocessing flow is shown in FIG. 10.

In this embodiment, in step S1040 from the data storage the stored datasets from the shipment sets identified by the processing stage identifiers collected in step S930 are obtained, and in step S1041 the representations of the shipment sets from the datasets obtained in S1040 are on a display.

In step S1042, a shipment set for reprocessing from the shipment sets retracted in step S932 is selected and prepared for packaging, i.e. for re-entering the packaging process.

In step S1043, a representation of the shipment set selected in step S1042 is selected from the representations displayed in step S1041.

In step S1044, the shipment set from step S1042 is submitted for packaging using the processing data associated with the representation selected in step S1043.

In step S1045 it is checked, if all shipment sets that needed to be re-entered in the packaging process are reprocessed? If not, the routine starts for a next shipment set, otherwise reprocessing is done.

FURTHER ASPECTS OF THE INVENTION

In case multiple entry stations are provided, complete shipments sets or items that somehow got out of the packaging process may be associated with the entry station, from which they were fed into the system. It is also possible that a shipment set originally fed into the system through a first entry station is re-entered into the system through a second entry station.

Under one aspect, a method of assisting associating one or more retracted shipment sets of one or more items to order processing data for said shipment sets at a system for packaging shipment sets with a plurality of processing stages, the method comprises:
  sequentially receiving (S710) for packaging shipment sets containing one or more items,
  repeating a loop which includes for each received shipment for packaging computer-implemented operations of
    obtaining (S711) an identification associated with said shipment set received in step S710,
    obtaining (S712) unique order processing data for processing said shipment set based on the identification obtained in S711,
    obtaining (S713) a unique processing set identification,
    obtaining (S715) one or more images of said shipment set,
    recording (S716) a dataset by associating and/or storing the unique processing set identification from S713 with said unique order processing data and said images,
    submitting (S717) said shipment set for packaging,
  repeating a loop which includes for each shipment set submitted for packaging computer-implemented operations of
    receiving (S820, S821) a further processing stage identifier unique to a further one of said processing stages when a shipment set is at said further one of said processing stages, and
    replacing (S822) said processing stage identifier by said further processing identifier in said dataset associated with said shipment set,
  on occurrence of a processing error by said system for packaging shipment sets
    finishing (S824) production of shipment sets not affected by the processing error by said system for packaging shipment sets,
    collecting (S930) the processing stage identifiers of the processing stages that cannot be further processed by said system for packaging shipment sets,
    retracting (S931) the shipment sets from said processing stages collected in step S930,
    obtaining (S1040) said datasets of data associated with said retracted shipment sets associated with said collected processing stage identifiers,
    outputting (S1041) the images associated with said retracted shipment sets to a display (116), and wherein said retracted shipment sets are reprocessed by said system for packaging shipment sets by repeating a loop comprising the steps of
      preparing (S1042) a retracted shipment set for reprocessing,
      selecting (S1043) the image from said retracted shipment set from said images outputted on said display thereby associating said unique order processing data for said shipment set with said shipment set again,
      submitting (S1044) said shipment set for packaging.

In such method, retracting shipment sets may comprise the steps of
  providing a visual indication at each processing stage from which the shipment sets have to be retracted,
  instructing an operator to retract the shipment sets from said indicated processing stages.

In such method, retracting shipment sets may comprise the step of diverting all to be retracted shipment sets to a diverting stage.

In such method, said dataset may be deleted when a shipment set is transported out of the control realm of said system for packaging shipment set.

Under one aspect, a method of assisting associating one or more retracted shipment sets of one or more items to order processing data for said shipment sets at a system for packaging shipment sets with a plurality of processing stages, comprises:
  sequentially receiving shipment sets containing one or more items for packaging,
  repeating a loop which includes for each received shipment for packaging computer-implemented operations of
    obtaining order processing data for processing said shipment set,
    obtaining an order profile of said shipment set,
    forming a dataset by associating and/or storing said order processing data and said order profile via a data structure,
    submitting said shipment set for packaging,
  repeating a loop which includes for each shipment set submitted for packaging computer-implemented operations of
    receiving a further processing stage identifier unique to a further one of said processing stages when a shipment set is at said further one of said processing stages and
    replacing said processing stage identifier by said further processing identifier in said set of data associated with said shipment set.
  on occurrence of a processing error by said system for packaging shipment sets obtaining from said data structure the datasets associated with said retracted shipment sets associated with said collected processing stage identifiers
submitting said retracted shipment sets for reprocessing wherein said order profile is used to associate said order processing data again with said shipment set In such method, said order profile may comprise a scan of said shipment set wherein each individual item is uniquely identified and wherein said stored order profile is matched with a new order profile made when a shipment set is prepared for reprocessing. Said order profile may comprise an RFID map comprising an RFID identification of all items within said shipment set. The order profile may alternatively or additionally comprise one or more images of said shipment set, and said retracted shipment sets may be reprocessed by
outputting the images associated with said retracted shipment sets to a display (116),
repeating a loop comprising the steps of
preparing a retracted shipment set for reprocessing
selecting the image from said retracted shipment set from said images outputted on said display thereby associating said processing data for said shipment set with said shipment set again
submitting said shipment set for packaging.

The order processing data may comprise information for printing on a shipping label.

In one of the aforementioned methods, a step of detecting secondary processing stages that are compromised by the error at a stage of the automated packaging process may be foreseen, wherein said collection of datasets is extended to all datasets which contain the unique processing set identifier(s) associated with said secondary processing stages. In case of an error, often multiple processing stages are compromised. In that case, detecting an error at a stage of the automated packaging process may trigger an automated alarm signal at said stage of the automated packaging process and said secondary compromised stages.

In one of the aforementioned methods, a graphical user interface may be used to show images of items and/or shipment sets and selecting representation(s) of shipment set(s) associated with one of the unique processing set identifiers in said collection may be done by selecting the images associated with the shipment set.

The invention claimed is:

1. A method of assisting error recovery in an automated packaging process of packaging shipment sets of one or more items in accordance with processing data, said packaging process comprising at least one entry stage upstream of a plurality of processing stages, the method comprising:
at an entry stage of the automated packaging process, for each shipment set prior to packaging the shipment set:
assigning a unique processing set identifier to the shipment set,
obtaining processing data for the shipment set,
acquiring a representation of each item in the shipment set, said acquiring comprising at least one of taking a picture of the entire shipment set or of the individual one or more items forming the shipment set, scanning machine-readable data carriers provided on at least one item of the shipment set, in particular scanning an RFID tag, a barcode or a QR code symbol, and
recording a dataset in a database by associating said unique processing set identifier with the processing data of said shipment set and with said representation, and
submitting the shipment set for packaging,
wherein a progress of each individual shipment set in the automated packaging process is tracked using an elapsed time based functionality and/or a sensor based functionality and by updating the dataset with a processing stage identifier,
on occurrence of a processing error affecting a shipment set:
obtaining a collection of datasets of each shipment set potentially affected, comprising identifying datasets comprising a specific processing stage identifier,
configuring a user interface at the entry stage with the representations of the shipment sets in said collection and for allowing selecting an affected shipment set, comprising displaying on a display device, in particular on a touch screen, images of the shipment sets or a list of items belonging to each shipment set, and
selecting on the user interface a shipment set for re-entering and re-entering at least one of the one or more items of the affected shipment sets into the automated packaging process using the processing data recorded in the dataset of the selected shipment set.

2. The method according to claim 1, wherein upon re-entering the one or more items of the affected shipment sets into the automated packaging, completeness of the shipment set is automatically checked.

3. The method according to claim 1, further comprising detecting an error at a stage of the automated packaging process and triggering an automated alarm indication at said stage.

4. The method according to claim 1,
wherein acquiring a representation of the shipment set comprises acquiring a representation of each item in the shipment set and
wherein configuring the user interface with the representations of the shipment sets in said collection comprises grouping similar or identical representations of several shipment sets on a first display level and showing on a second display level representations of other items in a shipment set upon selecting a representation on the first level.

5. The method according to claim 1, wherein the items in the shipment sets are equipped with RFID tags, and wherein acquiring a representation of the shipment set comprises scanning the RFID tag of each item in a shipment set to acquire an RFID tag profile as said representation and wherein said configuring a user interface comprises scanning the RFID tag of at least one item of a shipment set that shall be re-entered.

6. A non-transitory computer-readable medium that stores computer-executable instructions which, when executed by a computer, cause the computer to:
at an entry stage of an automated packaging process, for each shipment set prior to packaging the shipment set:
assign a unique processing set identifier to the shipment set,
obtain processing data for the shipment set,
acquire a representation of each item in the shipment set, said acquiring comprising at least one of taking a picture of the entire shipment set or of the individual one or more items forming the shipment set, scanning machine-readable data carriers provided on at least one item of the shipment set, in particular scanning an RFID tag, a barcode or a QR code symbol, and record a dataset in a database by associating said unique processing set identifier with the processing data of said shipment set and with said representation, and submit the shipment set for packaging, wherein a progress of each individual shipment set in the automated packaging process is tracked via an elapsed time based functionality and/or a sensor based functionality and by updating the dataset with a processing stage identifier, on occurrence of a processing error affecting a shipment set:
 obtain a collection of datasets of each shipment set potentially affected, comprising identifying datasets comprising a specific processing stage identifier,
 configure a user interface at the entry stage with the representations of the shipment sets in said collection and for allowing selecting an affected shipment set, comprising displaying on a display device, in particular on a touch screen, images of the shipment sets or a list of items belonging to each shipment set, and
 select on the user interface a shipment set for re-entering and re-entering one or more items of the affected shipment sets into the automated packaging process using the processing data recorded in the dataset of the selected shipment set, and further to:
 assign a unique processing set identifier,
 obtain processing data for the shipment set,
 acquire a representation of the shipment set,
 record a dataset,
 obtain a collection of datasets, and
 configure a user interface.

7. A system for assisting error recovery in an automated packaging process of packaging shipment sets of one or more items performed at a packaging system for automated packaging comprising a plurality of stations for performing different stages of said packaging process, the system comprising at an entry station of the automated packaging system:
 a computer storing a database and configured with non-transitory computer-readable medium that stores computer-executable instructions which, when executed by a computer, cause the computer to:
 at an entry stage of the automated packaging process, for each shipment set prior to packaging the shipment set:
  assign a unique processing set identifier to the shipment set,
  obtain processing data for the shipment set,
  acquire a representation of each item in the shipment set, said acquiring comprising at least one of taking a picture of the entire shipment set or of the individual one or more items forming the shipment set, scanning machine-readable data carriers provided on at least one item of the shipment set, in particular scanning an RFID tag, a barcode or a QR code symbol, and
  record a dataset in a database by associating said unique processing set identifier with the processing data of said shipment set and with said representation, and
 submit the shipment set for packaging,
 wherein a progress of each individual shipment set in the automated packaging process is tracked via an elapsed time based functionality and/or a sensor based functionality and by updating the dataset with a processing stage identifier,
 on occurrence of a processing error affecting a shipment set:
  obtain a collection of datasets of each shipment set potentially affected, comprising identifying datasets comprising a specific processing stage identifier,
  configure a user interface at the entry stage with the representations of the shipment sets in said collection and for allowing selecting an affected shipment set, comprising displaying on a display device, in particular on a touch screen, images of the shipment sets or a list of items belonging to each shipment set, and
  select on the user interface a shipment set for re-entering and re-entering the one or more items of the affected shipment sets into the automated packaging process using the processing data recorded in the dataset of the selected shipment set, and and further to:
   assign a unique processing set identifier,
   obtain processing data for the shipment set,
   acquire a representation of the shipment set,
   record a dataset,
   obtain a collection of datasets, and
   configure a user interface,
 wherein the user interface is at the entry station and is configurable with the representations of the shipment sets in said collection, said interface allowing selecting an affected shipment set for re-entering at least one of the one or more items of the affected shipment sets into the automated packaging process using the processing data recorded in the dataset of the selected shipment set.

8. The system according to claim 7, comprising at least one of
 a camera for taking a picture of the shipment set or parts of the shipment set for acquiring said representation,
 a scanner for scanning machine-readable data carriers provided on at least one item of the shipment set, in particular for scanning an RFID tag, a barcode symbol or a QR code symbol for acquiring said representation, and
 a screen, in particular a touch screen as said user interface for displaying the representations of the shipment sets in said collection.

9. The A-system according to claim 7, further comprising:
 a plurality of stations and equipment to perform different stages of a packaging process to automatically packaging varying shipment sets in custom-sized cardboard boxes, the plurality of stations and equipment comprising:
 at least one entry station of the automated packaging system,
 a station for obtaining information on an overall length, width and height dimensions of a shipment set consisting of one or more items to be packaged and for calculating, based on said information, a layout of a cardboard box blank for a box comprising a bottom panel and sidewalls,
 structure for cutting and creasing cardboard to have the calculated box blank layout,
 structure for folding a box out of said cardboard box blank, and
 structure for placing the shipment set on the bottom panel prior to or after erecting the sidewalls.

10. The system of claim 9 further comprising alarm indicators at each station where errors may occur and/or where shipment sets may have to be retracted.

11. The method according to claim 1, further comprising:
automatically packaging varying shipment sets in custom-sized cardboard boxes, by:
obtaining an overall length, width and height dimensions of a shipment set consisting of one or more items to be packaged,
calculating, based on said overall length, width and height dimensions of said shipment set, a layout of a cardboard box blank for a box for the shipment set, said box having a bottom panel and sidewalls,
cutting and creasing cardboard to form a cardboard box blank having the calculated layout, and
conveying the shipment set onto a bottom panel prior to or after folding a box out of said cardboard box blank.

* * * * *